United States Patent Office 3,420,869
Patented Jan. 7, 1969

3,420,869
UNSATURATED NITRATED ESTERS
John C. Wekell, Seattle, Clifford R. Houle, Renton, and Donald C. Malins, Seattle, Wash., assignors to the United States of America as represented by the Secretary of the Interior
No Drawing. Filed Apr. 13, 1967, Ser. No. 630,516
U.S. Cl. 260—467
Int. Cl. C07c 77/02
6 Claims

ABSTRACT OF THE DISCLOSURE

Unsaturated nitrate esters are made in high yield from a reactant consisting of an unsaturated alcohol or an unsaturated hydroxy acid by mixing the reactant with acetic anhydride then adding a stoichiometric amount of nitric acid, or by adding acetyl nitrate to the reactant so that the acetyl nitrate is consumed as it is added. 1-nitrato-octadeca-cis-9, cis-12, cis-15 triene (linolenyl nitrate) and 1-nitrato-octadeca-cis-9 monoene (oleyl nitrate) may be formed using this process. These unsaturated nitrate esters are useful as paint and oil additives.

BACKGROUND OF INVENTION

Field of invention

This invention relates to the production of nitrate esters. More specifically, it is concerned with a process by which unsaturated nitrate esters may be prepared from unsaturated alcohols, and hydroxy acids.

Description of prior art

The prior art recognizes three techniques for preparing nitrate esters. They are, (1) reaction of an alcohol with concentrated nitric acid; (2) reaction of an alcohol with mixtures of concentrated nitric acid and sulfuric acid; and (3) reaction of an alcohol with mixtures of nitric acid and acetic anhydride, accomplished by contacting acetic acid with a mixture of nitric acid and a saturated alcohol such that high ratios of acetyl nitrate/alcohol are formed.

These procedures as currently practiced suffice for the preparation of saturated nitrate esters but are unsatisfactory for making unsaturated products. When unsaturated alcohols are treated in accordance with any of these recognized procedures in an attempt to produce an unsaturated nitrate ester the inevitable result is an attack not only on the alcohol groups but also on the carbon-to-carbon double bonds present in the unsaturated alcohol chain. If an unsaturated product is prepared by one of the prior art methods, it can only be done so at very low yields and thus at high expense.

SUMMARY

This invention presents a process for preparing unsaturated nitrate esters from unsaturated alcohols or unsaturated hydroxy acids by a selective nitration wherein high yields of unsaturated products are obtained.

These unsaturated nitrate esters are useful wherever "setting" or polymerization characteristics are desirable. Applications include paint and oil additives. Further, nitrate esters are oxidizing agents and because of their low vapor pressures and compatibility with petroleum products, they have wide application as "scavengers" for reducing substances (e.g., sulfhydryl compounds) in high temperature oils. Still further, unsaturated nitrate esters are useful as intermediates in the production of quaternary salts from animal and vegetable oils.

Accordingly, it is an object of this invention to provide an improved method for preparing unsaturated nitrate esters. Other objects and advantages will become apparent from the following detailed description of the preferred embodiments of the invention.

DESCRIPTION OF PREFERRED EMBODIMENTS

The present invention accomplishes a selective nitration of the alcohol group of an unsaturated or fatty alcohol in preference to an attack on the carbon-carbon double bonds in the alcohol chain. This selective reactivity is accomplished by controlling the mode of introducing the reactants and the amount of nitrating agent.

The reaction is accomplished by the combined action of acetic anhydride and nitric acid upon the unsaturated alcohol. Acetic anhydride and nitric acid are known to form acetyl nitrate, a nitrating agent, and that compound is probably formed in situ in the process of the present invention. Yet, unless the reactants are added in a certain manner high yields of unsaturated nitrate ester are unobtainable. To get the desired result, the alcohol must first be mixed with 3 to 10 moles of acetic anhydride per mole of alcohol. To this mixture nitric acid is added in the range of from about 1 to 2 moles per mole of alcohol present. It is important also that the temperature during the nitric acid addition and subsequent reaction be held below 30° C. Preferably, this temperature should be held between 20 to 25° C. Alternatively, the acetyl nitrate may be formed beforehand using 3 to 10 moles of acetic anhydride per mole of alcohol and 1 to 2 moles of nitric acid per mole of alcohol. The acetyl nitrate may then be slowly added to the alcohol. It is critical that the unsaturated alcohol never be in contact with a very high concentration of acetyl nitrate such as would occur if the alcohol were added to the acetyl nitrate which, for example, is the procedure followed in U.S. Patent 3,305,567 by Houle et al. directed to the preparation of nitrated fatty acid esters.

The reaction products are less dense than water and are insoluble in water or dilute aqueous acid solutions. Consequently they will float upon the surface as an oily layer. An mechanical separation technique, such as floatation or centrifugation may be used to recover the product.

It has further been found that unsaturated nitrate esters may be formed by the above procedures using unsaturated hydroxy acids as reactants.

The following examples are set forth as illustrative of the invention:

EXAMPLE 1

Nitration of linolenyl alcohol

Linolenyl alcohol (9:12-octadecadien-1-ol, 4.9 g., 0.0186 mole), 10 ml. acetic anhydride, and 10 ml. acetic acid were added to a three-necked flask equipped with a thermometer, dropping funnel, nitrogen inlet tube, and magnetic stirring bar. The contents of the flask were cooled at 15° C. by means of an ice-water bath. The reaction was stirred and 1.2 ml. (0.019 mole) of 70% nitric acid was added dropwise over a 15 minute period. After addition of the nitric acid, the mixture was stirred for 15 minutes and the temperature was maintained at 15° C. throughout the reaction. Water (3 ml.) was added and the solution was allowed to come to room temperature. When hydrolysis of excess acetic anhydride and acetyl nitrate was complete, 25 ml. of diethyl ether was added to solubilize the product. The organic phase was washed with 25 ml. of water four times, and then with 50 ml. of 5% sodium bicarbonate solution. Finally, the organic phase was washed several times with water until neutral and dried over anhydrous sodium sulfate. A pale yellow oil (5.7 g.) was recovered by vacuum evaporation of the ether.

Analysis of the crude product by thin-layer chromatography and infrared spectroscopy (D. C. Malins, J. C.

Wekell, C. R. Houle, Anal. Chem., 36, 658 (1964), indicated an impurity of 15% acetate ester, and 10% unreacted alcohols and polar side products. In order to facilitate chromatographic purification, the acetate impurity was eliminated by refluxing the crude produce in 1% ethanolic potassium hydroxide solution for 30 minutes. After saponification of the mixture, the nitrate ester was purified by column chromatography on silicic acid (60 g., 100 mesh, Mallinckrodt analytical grade). The nitrates were eluted with 100:4 v./v. petroleum ether (30–60° C.)-diethyl ether. A clear, colorless oil (3.6 g., 63% yield) was obtained.

*Analysis.*—Calculated for $C_{18}H_{31}NO_3$: C, 69.98%; H, 10.02%; N, 4.53%. Found: C, 70.30%; H, 10.04%; N, 4.16%. Iodine value (Wijs). Calculated: 247.7, found, 244.1.

The product exhibited characteristic nitrate infrared absorbencies at: $6.11\mu$ (asymmetrical stretching), $7.94\mu$ (symmetrical stretching), $11.64\mu$ (O'N stretching), $13.2\mu$ (out of plane), and $14.4\mu$ ($NO_2$ bending). Nuclear Magnetic Resonance Spectroscopy (NMR) unequivocally demonstrated the structure to be 1-nitrato-octadeca-cis-9, cis-12, cis-15-triene.

In the remaining examples, the following procedure was followed:

The nitrations were carried out in a three-necked flask equipped with thermometer, nitrogen inlet tube, dropping funnel, and magnetic stirring bar. Temperature of the contents of the flask were maintained between 20–25° C. by means of an ice-water bath. The alcohol to be nitrated was mixed with the acetic anhydride (and a suitable organic solvent when the alcohol was insoluble) and stirred during the addition of the nitric acid. After addition of the nitric acid was complete, the contents of the reaction flask were stirred for 15 minutes, then sufficient water was added to hydrolyze excess acetic anhydride and acetyl nitrate. If no organic solvent was used, petroleum ethr (B.P. 30–60° C.) was added to give a homogeneous solution. If chloroform was used, more chloroform was added in order to ease the handling in the subsequent washings.

The organic phase was then washed twice with water, once with a 5% aqueous solution of either sodium carbonate or sodium bicarbonate, washed three times with water, dried over anhydrous sodium sulfate, and the organic solvent removed by rotary evaporation. In order to facilitate chromatographic separation of the nitrates from the acetate esters, the crude product was refluxed in 5% ethanolic potassium hydroxide solution for 30 minutes. After the nitrates were recovered from the saponification mixture in the usual way, they were then separated by column chromatography on silicic acid, using a loading ratio of 1:10 (crude nitrates to silicic acid). Benzene was used to elute the pure nitrate esters, unless otherwise noted. Thin-layer chromatography (TLC) and infrared spectrometry were used for the analysis of the purified nitrates. When the purified product was demonstrated to be homogeneous by TLC, approximately 10–20 mg. were sealed in ampules and sent for elemental analysis.

EXAMPLE 2

Nitration of oleyl alcohol (1-ol-octadeca-cis-9-monoene)

Oleyl alcohol (1-ol-octadeca-cis-9-monoene, 4.9 g., 0.0186 mole), was treated in the same way as linolenyl alcohol was in Example 1. A yield of 5.1 g. of pale yellow oil was obtained. TLC of this crude product indicated about 15% acetate ester and about 10% unreacted alcohol. The crude nitrate, 1.1 g., was purified by column chromatography on silicic acid (10 g., 100 mesh, Mallinckrodt analytical grade). The nitrate was eluted with pure petroleum ether (30–60° C.). Pure oleyl nitrate, 1-nitrato-octadeca-cis-9-monoene (0.7 g., 64% yield) was obtained as a colorless oil.

*Analysis.*—Calculated for $C_{18}H_{36}NO_3$: C, 68.78%; H, 11.46%; N, 4.45%. Found: C, 69.78%; H, 10.71%; N, 4.52%. Iodine value (Wijs). Calculated: 81.46. Found: 78.7.

Characteristic nitrate related infrared absorbancies: $6.12\mu$ ($NO_2$ asymmetrical stretching), $7.89\mu$ ($NO_2$ symmetrical stretching), $11.65\mu$ (O'N stretching), $13.6\mu$ (out of plane), and $14.4\mu$ ($NO_2$ bending).

EXAMPLE 3

Nitration of cholesterol

Because cholesterol was found to be insoluble in acetic anhydride solutions, the use of an organic solvent was necessary. It was found that cholesterol was readily soluble in cholorform. Cholesterol (3.9 g., 0.010 mole) was dissolved in 10 mls. of cholorform. Acetic anhydride was also dissolved in 10 mls. of chloroform and then mixed with the cholesterol solution. Nitric acid (1.4 mls., 0.02 mole, dissolved in 5 mls. acetic acid) was added slowly to the reaction mixture. Work-up was as described above, except that sodium carbonate was used. After evaporation of the chloroform, 4.0 g. of a pale yellow crystalline solid was recovered. TLC examination of the crude product indicated acetate ester and unreacted alcohol contamination. The crude nitrate (1.3 g.) was purified by column chromatography yielding a colorless crystalline solid (1.2 g.).

*Analysis.*—Calculated for $C_{27}H_{45}NO_3$: C, 75.17%; H, 10.44%; N, 3.24%. Found: C, 75.35%; H, 10.32%; N, 3.27%.

Characteristic nitrate related infrared absorbancies: $6.14\mu$, $6.18\mu$ ($NO_2$ asymmetrical stretching), $7.88\mu$ ($NO_2$ symmetrical stretching), 11.46 (O'N stretching), $13.2\mu$ (out of plane), $14.4\mu$ ($NO_2$ bending).

EXAMPLE 4

Nitration of benzyl alcohol

Benzyl nitrate was prepared by a slightly different procedure. (Benzyl nitrate, prepared in the usual manner, was lost when it was refluxed in ethanolic potassium hydroxide.) The acetyl nitrate solution was preformed and then slowly added to the benzyl alcohol solution. As before, the acetyl nitrate is consumed as it is added to the alcohol solution. The acetyl nitrate solution was preformed by dissolving 5.2 mls. of acetic anhydride in 10 mls. of chloroform, and then adding 1.45 mls. nitric acid (70%). Benzyl alcohol (2.2 g., 0.02 mole) was dissolved in 10 mls. chloroform, then the pre-formed acetyl nitrate solution was slowly added. The mixture was stirred for 30 minutes and then 4 mls. of water added. The organic phase was washed 4 times with hot aqueous sodium carbonate, 3 times with hot water, and dried over anhydrous sodium sulfate. Upon removal of the chloroform, 1.5 g. of a pale yellow oil was obtained. The low yield is attributed to the hot washes. This product was purified by column chromatography yielding 1.4 g. of a colorless product.

*Analysis.*—Calculated for $C_7H_7NO_3$: C, 54.90%; H, 4.57%; N, 9.15%. Found: C, 54.98%; H, 4.64%; N, 9.06%.

Characteristic nitrate infrared absorbancies: $6.16\mu$ very broad ($NO_2$ asymmetrical stretching), $7.90\mu$ very broad ($NO_2$ symmetrical stretching), $11.6\mu$ very broad (O'N stretching), $13.2\mu$ (out of plane), and $14.4\mu$ ($NO_2$ bending). The $13.2\mu$ and $14.4\mu$ absorbance may not have much meaning because they are regions that are characteristic of aromatic compounds.

EXAMPLE 5

Nitration of ricinoleic acid (cis-12-hydroxy oleic acid)

Ricinoleic acid (1.0 g., 0.0029 mole) and 3 mls. of acetic anhydride were mixed in 10 mls. of chloroform. To this mixture nitric acid 0.25 mls. (70%) was added slowly. After hydrolysis was complete, the organic phase was washed once, reduced in volume to approximately 2 mls., 50 mls. of a 5% ethanolic solution of potassium hydroxide was added, then the mixture was refluxed for 30 minutes. The crude product was recovered from the saponification mixture yielding approximately 1 g. of a yellow oil. This material was column chromatographed in the manner described above. The nitrate derivative was eluted with 80/20 (benzene-ethyl ether). The purified nitrate was a yellow oil (0.5 g.).

Analysis.—Calculated for $C_{18}H_{34}NO_5$: C, 62.79%; H, 9.88%; N, 4.06%. Found: C, 64.86%; H, 9.45%; N, 3.46%.

Characteristic nitrate related infrared absorbancies: 6.14$\mu$ ($NO_2$ asymmetrical stretching), 7.93$\mu$ ($NO_2$ symmetrical stretching), 11.6$\mu$ (O'N stretching), 13.2$\mu$ (out of plane), 14.4$\mu$ ($NO_2$ bending), and 5.87$\mu$ (acid carbonyl).

From the preceding Examples 1–4, it can be seen that there has been described a novel and useful method for selectively nitrating a variety of unsaturated alcohols to form unsaturated nitrate esters. Example 5 shows that the same method is applicable in the selective nitration of long chain unsaturated hydroxy acids such as ricinoleic acid.

Together, the examples show the exceptional selectivity obtainable with the present method which prevents attack on the double bonds present in the unsaturated reactant.

While the invention has been described by reference to preferred embodiments, it will be apparent to those skilled in the art that the method is applicable in the formation of unsaturated nitrate esters from a variety of compounds including unsaturated alcohols and unsaturated hydroxy acids.

What is claimed is:
1. A process of obtaining unsaturated nitrate esters which comprises:
 (a) adding to a reactant consisting of an unsaturated alcohol an amount of acetic anhydride in the range of from about 3 to 10 moles per mole of said reactant;
 (b) adding to the mixture formed in (a) an amount of nitric acid in the range of from about 1 to 2 moles per mole of said reactant, said addition of nitric acid being at a temperature of less than 30° C. to form a reaction product; and
 (c) separating the reaction product.

2. A process of obtaining unsaturated nitrate esters which comprises: adding a solution of acetyl nitrate to a reactant consisting of an unsaturated alcohol, said solution being formed by the combination of from about 3 to 10 moles of acetic anhydride per mole of reactant said addition being at a temperature of less than 30° C. whereby a reaction product is formed, and separating the reaction product.

3. The process of claim 1 wherein said reactant is selected from the group consisting of linolenyl alcohol, oleyl alcohol, cholesterol, and ricinoleic acid.

4. The method of claim 2 wherein said reactant is benzyl alcohol.

5. 1-nitrato-octadeca-cis-9, cis-12, cis-15-triene.

6. 1-nitrato-octadeca-cis-9-monoene.

References Cited

UNITED STATES PATENTS

| | | | |
|---|---|---|---|
| 2,396,330 | 3/1946 | Lufkin | 260—466 X |
| 3,215,713 | 11/1965 | Barton | 260—466 X |

OTHER REFERENCES

Lane, J. Chem. Soc. (London), pp. 1172 to 1175 (1953).

LELAND A. SEBASTIAN, Primary Examiner.

U.S. Cl. X.R.

260—397.2, 466